(12) United States Patent
Kuesel et al.

(10) Patent No.: US 9,239,791 B2
(45) Date of Patent: *Jan. 19, 2016

(54) CACHE SWIZZLE WITH INLINE TRANSPOSITION

(71) Applicant: International Business Machines Corporation, Armonk, NY (US)

(72) Inventors: Jamie R. Kuesel, Rochester, MN (US); Mark G. Kupferschmidt, Bothell, WA (US); Paul E. Schardt, Rochester, MN (US); Robert A. Shearer, Woodinville, WA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/800,669

(22) Filed: Mar. 13, 2013

(65) Prior Publication Data

US 2014/0164704 A1      Jun. 12, 2014

Related U.S. Application Data

(63) Continuation of application No. 13/712,094, filed on Dec. 12, 2012.

(51) Int. Cl.
*G06F 12/08* (2006.01)
(52) U.S. Cl.
CPC ........ *G06F 12/0811* (2013.01); *G06F 12/0802* (2013.01)
(58) Field of Classification Search
CPC ............ G06F 12/0802; G06F 12/0811; G06F 12/0844; G06F 12/0846; G06F 12/0875; G06F 12/0864; G06F 12/0866; G06F 12/0886; G06F 17/30091; G06F 17/3015; G06F 17/30194; G06F 3/061; G06F 3/0656; G06F 8/63; G06F 9/4406
USPC .................. 711/112, 113, 118, 122, E12.018, 711/E12.044, E12.045, E12.056
See application file for complete search history.

(56) References Cited

U.S. PATENT DOCUMENTS 5,819,117 A * 10/1998 Hansen ......................... 712/300
5,852,738 A    12/1998 Bealkowski et al.
(Continued)

FOREIGN PATENT DOCUMENTS

GB         2385951       9/2003

OTHER PUBLICATIONS

Intel® Architecture Optimization Reference Manual, Intel Corporation, 1998, 1999.
(Continued)

*Primary Examiner* — Zhuo Li
(74) *Attorney, Agent, or Firm* — Middleton Reutlinger

(57) ABSTRACT

A method and circuit arrangement selectively swizzle data in one or more levels of cache memory coupled to a processing unit based upon one or more swizzle-related page attributes stored in a memory address translation data structure such as an Effective To Real Translation (ERAT) or Translation Lookaside Buffer (TLB). A memory address translation data structure may be accessed, for example, in connection with a memory access request for data in a memory page, such that attributes associated with the memory page in the data structure may be used to control whether data is swizzled, and if so, how the data is to be formatted in association with handling the memory access request.

11 Claims, 9 Drawing Sheets

(56) References Cited

U.S. PATENT DOCUMENTS

| | | | |
|---|---|---|---|
| 6,816,165 B1* | 11/2004 | Radke | 345/567 |
| 7,190,284 B1 | 3/2007 | Dye et al. | |
| 7,712,098 B2 | 5/2010 | Chauvel et al. | |
| 7,805,587 B1* | 9/2010 | Van Dyke et al. | 711/202 |
| 7,822,993 B2 | 10/2010 | Morais et al. | |
| 7,859,541 B2* | 12/2010 | Montrym et al. | 345/530 |
| 7,898,551 B2 | 3/2011 | Xu et al. | |
| 8,135,962 B2 | 3/2012 | Strongin et al. | |
| 2005/0155021 A1* | 7/2005 | DeWitt et al. | 717/130 |
| 2006/0036650 A1 | 2/2006 | Ito et al. | |
| 2006/0047936 A1 | 3/2006 | Morais et al. | |
| 2006/0059553 A1 | 3/2006 | Morais et al. | |
| 2006/0095793 A1 | 5/2006 | Hall | |
| 2006/0143350 A1 | 6/2006 | Miloushev et al. | |
| 2007/0245160 A1 | 10/2007 | Benhase et al. | |
| 2007/0283125 A1 | 12/2007 | Manczak et al. | |
| 2008/0016327 A1 | 1/2008 | Menon et al. | |
| 2008/0077922 A1 | 3/2008 | Doring | |
| 2008/0148029 A1* | 6/2008 | Luc et al. | 712/300 |
| 2008/0155273 A1* | 6/2008 | Conti | 713/190 |
| 2008/0240426 A1 | 10/2008 | Gueron et al. | |
| 2009/0031142 A1 | 1/2009 | Halevi et al. | |
| 2009/0055640 A1 | 2/2009 | Dale et al. | |
| 2009/0187734 A1 | 7/2009 | Mejdrich et al. | |
| 2009/0216956 A1* | 8/2009 | Ekanadham et al. | 711/137 |
| 2009/0228682 A1* | 9/2009 | Mejdrich et al. | 712/7 |
| 2010/0107241 A1 | 4/2010 | Jaber et al. | |
| 2010/0115250 A1 | 5/2010 | Kriegel et al. | |
| 2010/0250870 A1 | 9/2010 | Vick et al. | |
| 2010/0251260 A1 | 9/2010 | May | |
| 2010/0306499 A1 | 12/2010 | Petolino, Jr. | |
| 2010/0332786 A1 | 12/2010 | Grohoski et al. | |
| 2010/0332850 A1 | 12/2010 | Boivie | |
| 2011/0087840 A1 | 4/2011 | Glasco et al. | |
| 2011/0107057 A1 | 5/2011 | Petolino, Jr. | |
| 2011/0131402 A1 | 6/2011 | Mittal | |
| 2012/0042126 A1 | 2/2012 | Krick et al. | |

OTHER PUBLICATIONS

U.S. Appl. No. 13/355,806 entitled, "Memory Address Translation-Based Data Encryption/Compression" filed by Adam J. Muff on Jan. 23, 2012.

U.S. Appl. No. 13/355,827 entitled, "Memory Address Translation-Based Data Encryption with Integrated Encryption Engine" filed by Adam J. Muff on Jan. 23, 2012.

David Champagne et al., "Scalable Architectural Support for Trusted Software," High Performance Computer Architecture (HPCA), 2010 IEEE 16th International Symposium on HPCA, Piscataway, NJ, USA, Jan. 9, 2010, pp. 1-12.

International Search Report and Written Opinion of ISA dated May 23, 2013—International Application No. PCT/EP2013/050022.

U.S. Patent and Trademark Office, Office Action issued in related U.S. Appl. No. 13/355,806, dated May 28, 2013.

U.S. Patent and Trademark Office, Final Office Action issued in related U.S. Appl. No. 13/355,806, dated Oct. 2, 2013.

U.S. Patent and Trademark Office, Notice of Allowance issued in related U.S. Appl. No. 13/355,806, dated Jan. 29, 2014.

U.S. Patent and Trademark Office, Office Action issued in related U.S. Appl. No. 13/355,827, dated Nov. 14, 2013.

U.S. Patent and Trademark Office, Final Office Action issued in related U.S. Appl. No. 13/355,827, dated Apr. 11, 2014.

U.S. Patent and Trademark Office, Notice of Allowance issued in related U.S. Appl. No. 13/355,827, dated Sep. 30, 2014.

U.S. Patent and Trademark Office, Office Action issued in related U.S. Appl. No. 13/712,094, dated Sep. 30, 2014.

* cited by examiner

CACHE SWIZZLE WITH INLINE TRANSPOSITION

CROSS-REFERENCE TO RELATED APPLICATIONS

This application is a continuation of U.S. patent application Ser. No. 13/712,094, filed on Dec. 12, 2012 by Jamie R. Kuesel et al., the entire disclosure of which is incorporated by reference herein.

FIELD OF THE INVENTION

The invention is generally related to data processing, and in particular to processor architectures and the organization of data therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multithreading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A vector execution unit typically includes multiple processing lanes that handle different datapoints in a vector and perform similar operations on all of the datapoints at the same time. For example, for an architecture that relies on quad (4) word vectors, a vector execution unit may include four processing lanes that perform the identical operations on the four words in each vector.

The aforementioned techniques may also be combined, resulting in a multithreaded vector execution unit architecture that enables multiple threads to issue SIMD instructions to a vector execution unit to process "vectors" of data points at the same time. Typically, a scheduling algorithm is utilized in connection with issue logic to ensure that each thread is able to proceed at a reasonable rate, with the number of bubbles in the execution unit pipeline kept at a minimum.

Despite the significant performance capabilities of SIMD execution units, it has been found that there is a substantial amount of processing overhead consumed in arranging data into a format that takes advantage of the multiple lane SIMD execution units. This problem is aggravated, for example, when data is stored in memory in an array of structures (AOS) format and an execution unit processes data in a structure of arrays (SOA) format. Furthermore, in many instances, one process may require the data in one format, while another will require the data to be in a different format, which often forces data to be stored in memory in one format, with a processor loading and re-ordering the data into the other format before processing the data with an SIMD execution unit.

One conventional approach to this problem is to load all the data, and then move it around in the vector register file. This approach, however, typically wastes many instructions. Another approach is to "swizzle," or rearrange, the load data right before entering it into the register file. While this approach typically saves functional instructions, the approach still typically requires every load to make multiple accesses into a data cache.

As an example, many typical workloads that rely on SIMD operations follow a simple loop where there is a vector load, followed by a SIMD floating point operation such as a multiply add, and then followed by a vector store. In many conventional processor architectures, this three instruction sequence will be processed as a four cycle load, a single cycle math operation, and a four cycle store, resulting in a loop that is very cache bandwidth heavy and that does not take full advantage of the processing capabilities of an SIMD execution unit.

Therefore, a significant need continues to exist in the art for a manner of minimizing the performance overhead associated with arranging data in a suitable format for execution in a data processing system, particularly for execution using an SIMD execution unit.

SUMMARY OF THE INVENTION

The invention addresses these and other problems associated with the prior art by providing a method and circuit arrangement that selectively swizzle data in one or more levels of cache memory coupled to a processing unit based upon one or more swizzle-related page attributes stored in a memory address translation data structure such as an Effective To Real Translation (ERAT) or Translation Lookaside Buffer (TLB). A memory address translation data structure may be accessed, for example, in connection with a memory access request for data in a memory page, such that attributes associated with the memory page in the data structure may be used to control whether data is swizzled, and if so, how the data is to be formatted in association with handling the memory access request. As such, when the data is retrieved from the cache memory for processing by a processing unit, the data is formatted in a form that is optimized for efficient processing of the data by the processing unit.

Therefore, consistent with one aspect of the invention, data is accessed in a data processing system by, in response to a memory access request initiated by a processing unit in the data processing system, accessing a memory address translation data structure to perform a memory address translation for the memory access request; accessing at least one swizzle-related page attribute in the memory address translation data structure to determine whether data from the memory page associated with the memory access request should be swizzled; and causing data from the memory page to be stored in a cache memory in a swizzled format based upon the at least one swizzle-related page attribute.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention selectively swizzle data stored in one or more levels of cache memory based upon swizzle-related page attributes stored in a memory address translation data structure such as an Effective To Real Translation (ERAT) or Translation Lookaside Buffer (TLB). A memory address translation data structure may be accessed, for example, in connection with a memory access request for data in a memory page, such that attributes associated with the memory page in the data structure may be used to control whether and how data is swizzled in association with handling the memory access request. As such, when data is retrieved into a cache, the swizzle-related page attribute(s) may be used to control the selective swizzling of the data prior to storing in the cache.

Swizzling, in this regard, refers to permutation, transposition or otherwise rearranging data into a different arrangement. Typically, swizzling is performed in order to rearrange data into a format that is more suitable for performing a particular task with a processing unit. As will become more apparent below, for example, swizzling may be used to rearrange data to place it in a more suitable format for image or graphics processing, for processing packet headers, or in any of a number of other applications where data is processed in regular blocks or groups.

A swizzle-related page attribute may include, for example, an indicator of whether or not data in a page should be swizzled, at what level, or cache memory, data in a page should be swizzled, whether the data should be written back to higher level cache memories or invalidated when cast out, a stride length or size to indicate how data should be repacked in a cache memory, a size or amount of data to access at each stride, or any other swizzle-related information useful in selectively swizzling data in a cache memory.

Other variations and modifications will be apparent to one of ordinary skill in the art. Therefore, the invention is not limited to the specific implementations discussed herein.

Hardware and Software Environment

Figure 1:
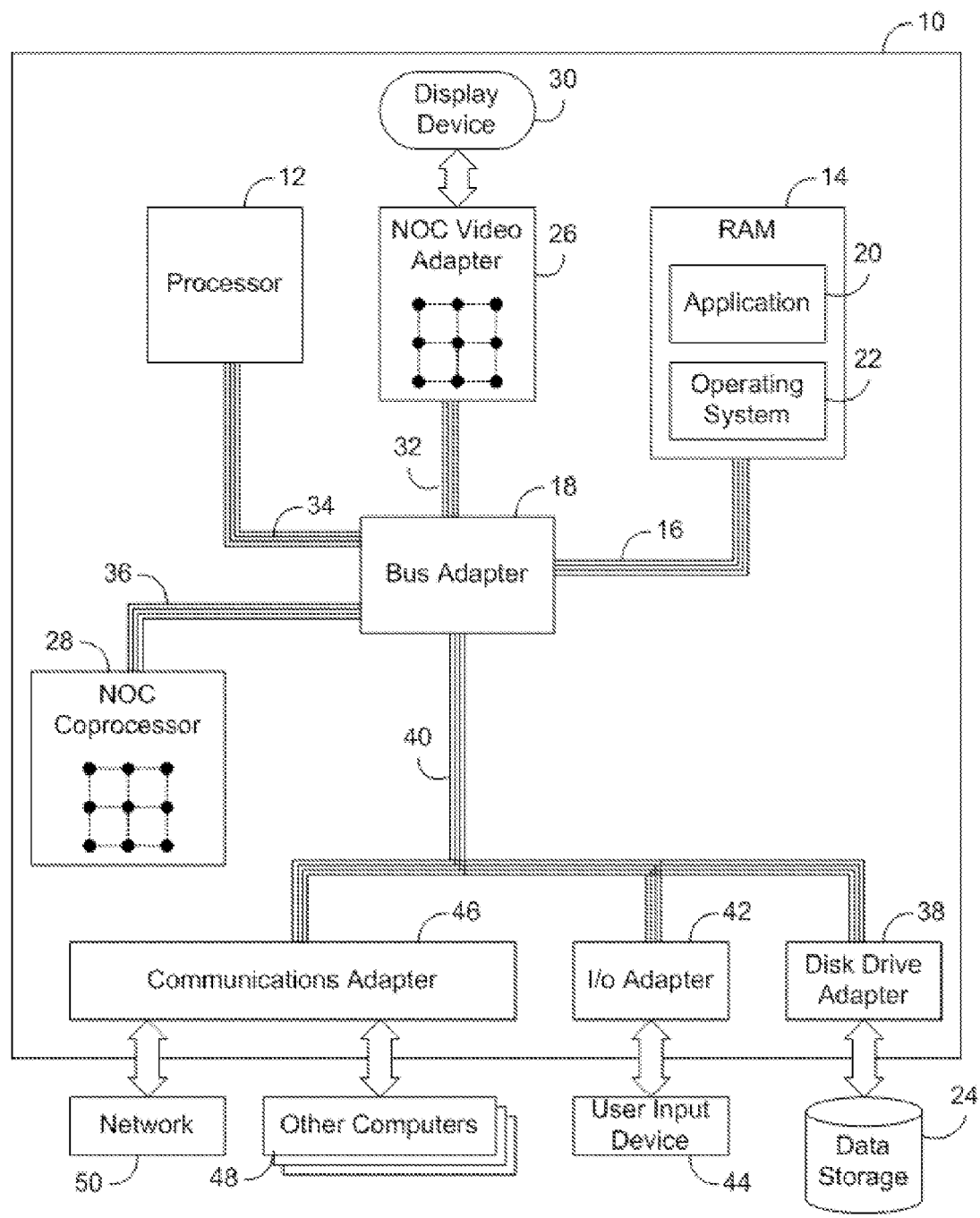
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
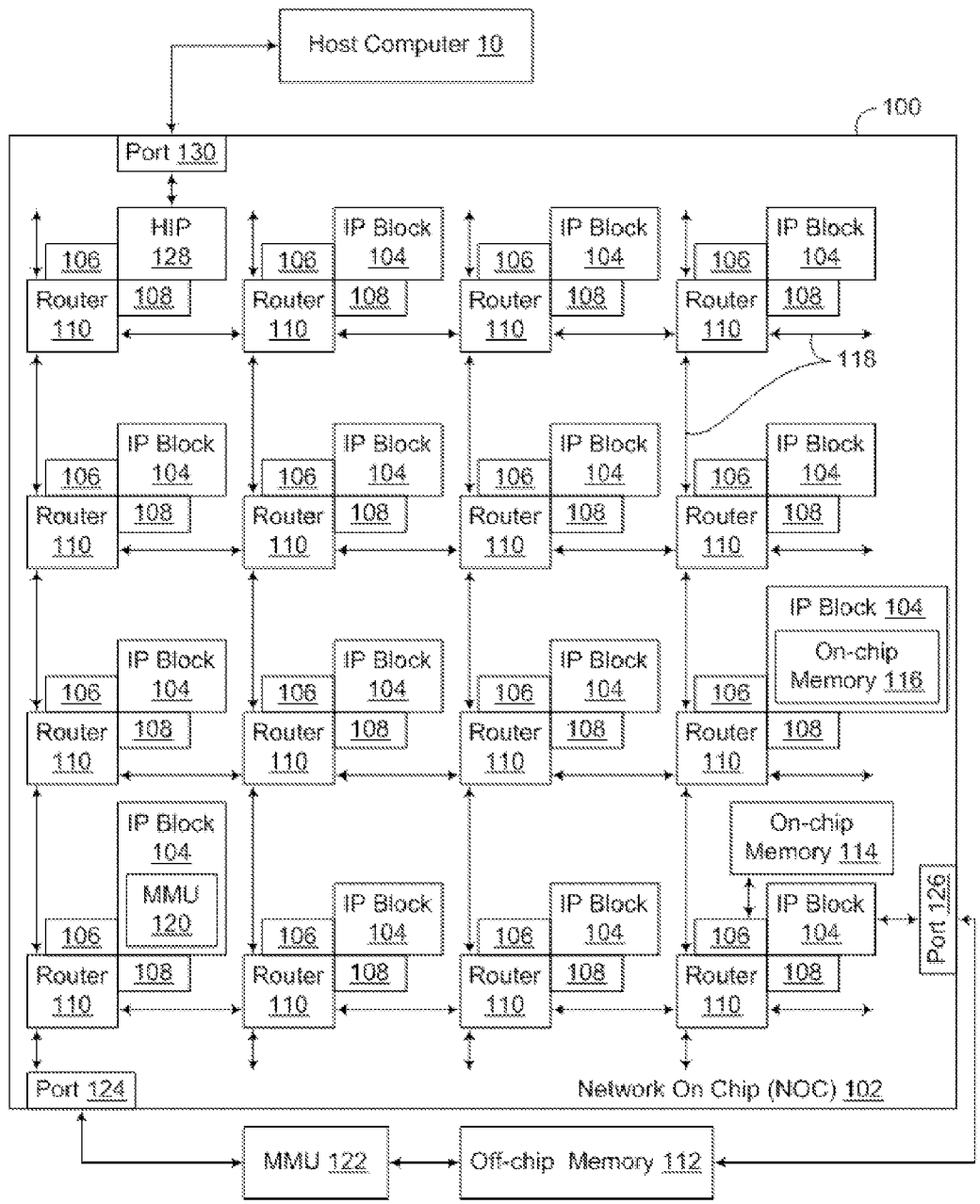
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
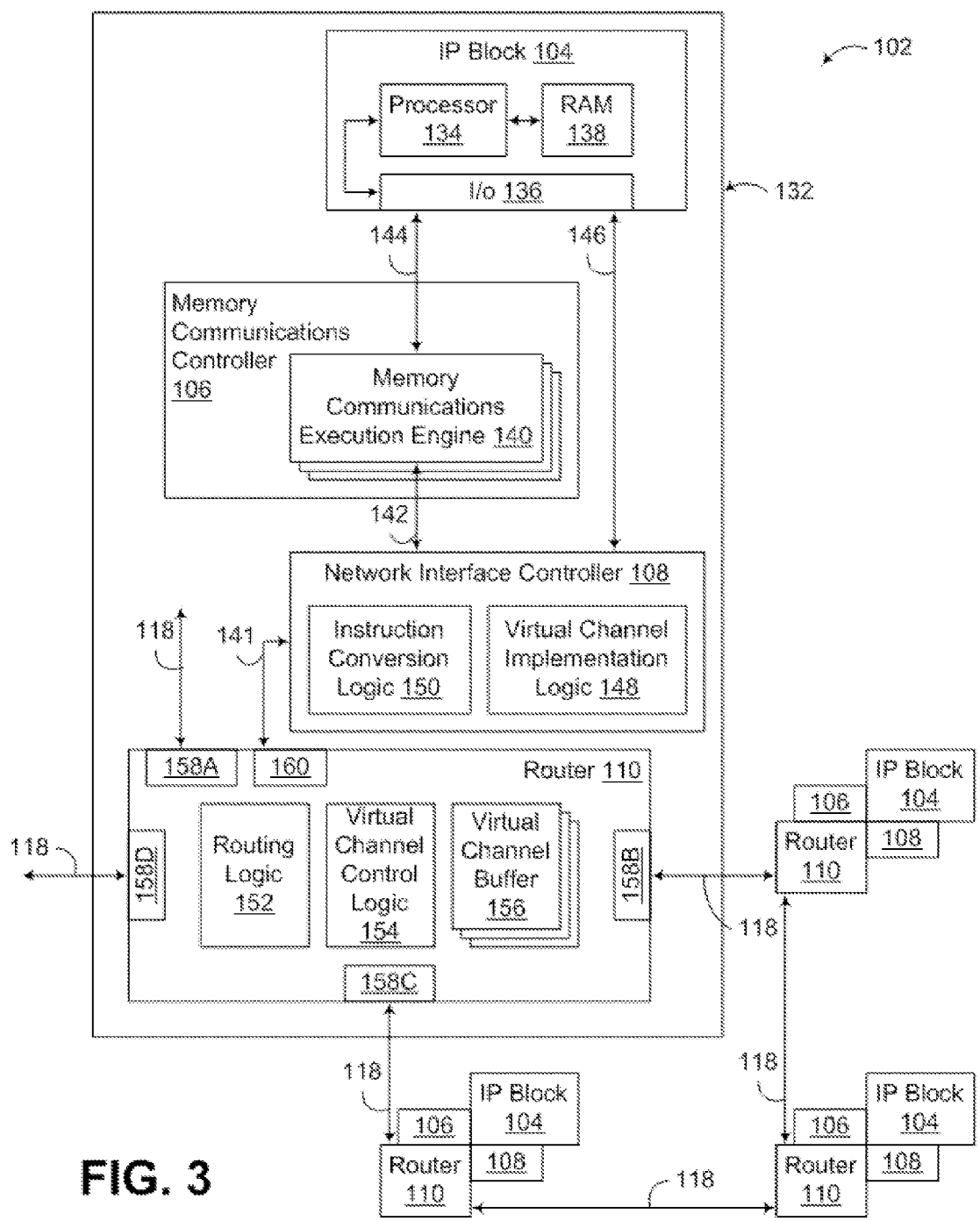
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
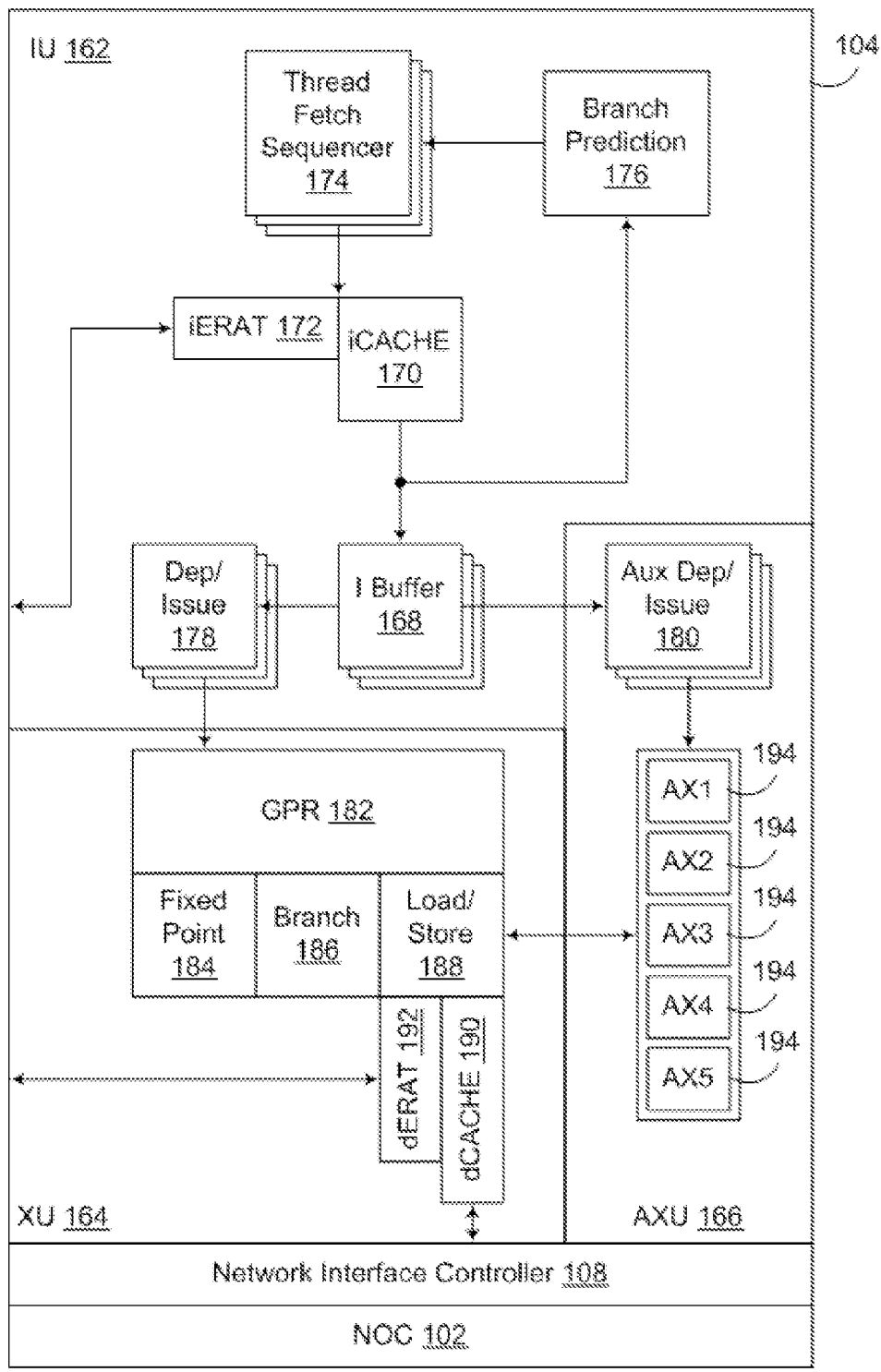
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32 b or 64 b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Address Translation-Based Swizzling

In a SIMD vector processing system there may a significant amount of overhead consumed in arranging data into a format that takes advantage of the multiple lanes in SIMD processing units. This problem is aggravated when data is stored in memory as an array of structures (AOS) and the processing requires data in a structure of arrays (SOA) format. In many cases, one process will want the data in one format, while another will prefer a different format, such that the data is stored in memory in one format and a processor is required to load and re-order the data before taking advantage of the SIMD vector unit.

Generally to address this problem, conventional designs may load all of the data and then move it around in the vector register file, which often wastes many instructions. Alternatively, the data may be swizzled right before being loaded into the register file. This latter approach typically saves functional instructions, but will still require every load to make multiple accesses into the data cache. Many workloads follow a simple loop where there is a vector load, followed by an SIMD floating point operation, followed by a vector store, and this three instruction sequence will typically be implemented as a four cycle load, a single cycle math operation, and a four cycle store. This approach becomes very cache bandwidth heavy and consequently does not take full advantage of the SIMD vector unit.

Embodiments consistent with the invention, on the other hand, utilize address translation data structures and logic to swizzle the data between levels of a memory system to allow storing swizzled data in one or more levels of cache memory to reduce cache accesses and increase performance. In particular, a page table entry (PTE), or other suitable data structure that is primarily used to translate effective or virtual addresses into real addresses in a memory architecture, may be used to store one or more swizzle-related page attributes that define whether or not the data stored in a specific page is to be swizzled. The PTE may be disposed, for example, in an Effective To Real Translation (ERAT) table, a Translation Lookaside Buffer (TLB) or a page table. Swizzle-related page attributes may also include other swizzle-related information such as a stride length or size to indicate how data should be repacked in a cache memory, the size of data to access at each stride, whether data should be written back to higher level cache memories or invalidated when cast out, and an indication of which level of cache memory the swizzle should occur, among others. This page may be an entire page, or simply a subpage as defined by the core architecture.

Figure 5:
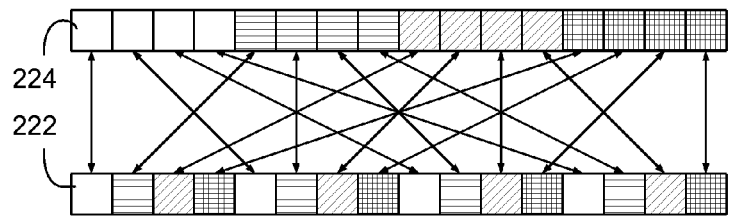
FIG. 5 is a block diagram illustrating an example swizzle operation consistent with the invention.

As shown in FIG. 5, for example, a cache line of data may be stored in main memory in the format illustrated at 222, whereas it may be desirable to store the data in one or more levels of cache memory using the format illustrated at 224 to facilitate processing, e.g., by a vector execution unit. Hardware logic associated with address translation logic and/or cache logic may be used to manage cache coherence on the cache line as with any other cache line, with a page table entry or other address translation data structure providing the hardware logic with attributes defining how the data is organized and how it should be accessed. Vector loads to this line may then return properly organized data in a single access, so as with the aforementioned simple loop example, the loop would use three processor execution cycles instead of nine, resulting in a significant speedup. Other byte or word accesses to this line may also calculate the proper offset based on a stride length and access size specified in the PTE.

In addition, while in some embodiments all data for swizzling may be required to be aligned on a cache line basis, this is not always desirable, so in some embodiments, it may be desirable to include an ability to span cache lines and extend stride lengths by supporting invalidates from higher level caches that can determine which cache lines must be invalidated. This can be done by either accessing an address translation data structure such as an ERAT for invalidates, or storing swizzle-related attributes in directory tag tables, which are already accessed for invalidates.

By supporting variable access and stride lengths other than vectors of words, functions such as loading one or more initial bytes of many communications packets and processing their headers in parallel may be supported. This would be useful, for example, for scalar integer processing of packets in addition to vector workloads.

In some embodiments, a mode bit, or instruction modifier bit defined in an instruction, may be included that controls whether only the requested cache line is returned upon a load access, or if all touched cache lines are returned. This would act as a prefetch function for cases where all elements of the vectors are going to be loaded.

In addition, as noted above, a level attribute may be used to specify within which, among several levels of cache memory, data is to be swizzled. In one embodiment of the invention, for example, data may be stored in an L2 and/or L3 cache in a standard memory format, and multiple processors may perform different work on the data as they pass ownership back and forth. The data may be retained in the standard format in the L2 and/or L3 caches, while each processor loads and swizzles the data differently into that processor's own L1 cache to optimize the accesses to the data for each particular processor.

In addition, in some embodiments, reordering data may also allow for data storage in a cache for more power optimized accesses. For example, swizzled data oftentimes may be stored in a single bank as opposed to being spread across multiple banks, which otherwise require more arrays to be active and consuming power.

Figure 6:
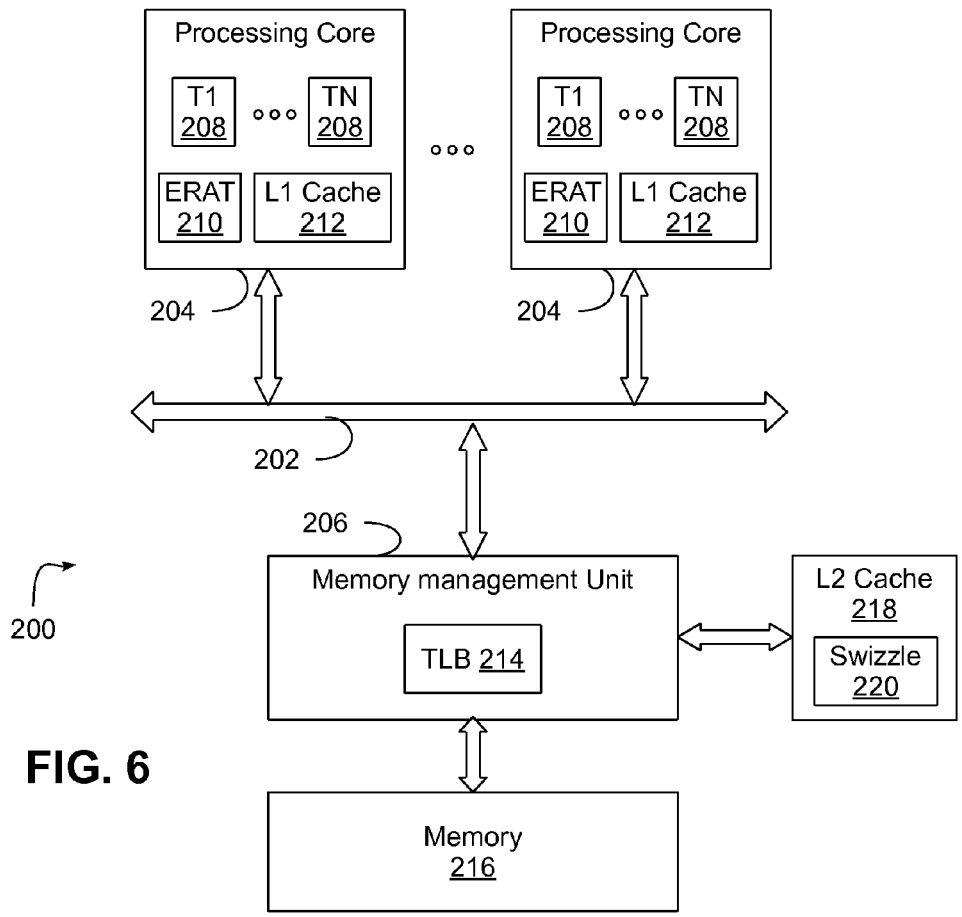
FIG. 6 is a block diagram of an exemplary data processing system incorporating memory address translation-based swizzling consistent with the invention.

FIG. 6, for example, illustrates an exemplary data processing system 200 suitable for implementing address translation-based swizzling consistent with the invention. System 200 is illustrated with a memory bus 202 coupling together a plurality of processing cores 204 to a memory management unit (MMU) 206. While only two processing cores 204 are illustrated in FIG. 6, it will be appreciated that any number of processing cores may be utilized in different embodiments of the invention.

Each processing core 204 is an SMT core including a plurality (N) of hardware threads 208, along with an Effective To Real Translation (ERAT) unit 210 and integrated L1 cache 212. ERAT 210, as is understood in the art, serves as a cache for memory address translation data, e.g., PTEs, and is typically associated with a lower level data structure, e.g., a translation lookaside buffer (TLB) 214 disposed in or otherwise accessible to MMU 206. TLB 214 may also serve as a cache for a larger page table, which is typically stored in a memory 216.

The memory system may include multiple levels of memory and caches, and as such, data processing system 200 is illustrated including an L2 cache 218 coupled to MMU 206 and shared by processing cores 204. It will be appreciated, however, that various alternative memory architectures may be utilized in other embodiments of the invention. For example, additional levels of cache memory, e.g., L3 caches, may be used, and memory 216 may be partitioned in some embodiments, e.g., in Non-Uniform Memory Access (NUMA)-based data processing systems. Furthermore, additional cache levels may be dedicated to particular processing cores, e.g., so that each processing core includes a dedicated L2 cache, which may be integrated into the processing core or coupled between the processing core and the memory bus. In some embodiments, an L2 or L3 cache may be coupled directly to the memory bus, rather than via a dedicated interface to an MMU.

In addition, it will be appreciated that the components illustrated in FIG. 6 may be integrated onto the same integrated circuit device, or chip, or may be disposed in multiple such chips. In one embodiment, for example, each processing core is implemented as an IP block in a NOC arrangement, and bus 202, MMU 206 and L2 cache 218 are integrated onto the same chip as the processing cores in a SOC arrangement. In other embodiments, bus 202, MMU 206, L2 cache 218, and/or memory 216 each may be integrated on the same chip or in different chips from the processing cores, and in some instances processing cores may be disposed on separate chips.

Given the wide variety of known processor and memory architectures with which the invention may be utilized, it will therefore be appreciated that the invention is not limited to the particular memory architecture illustrated herein.

To implement address translation-based swizzling consistent with the invention, data processing system 200 includes swizzle logic 220, e.g., disposed within L2 cache 218, and usable to selectively swizzle cache lines stored at various levels of a memory subsystem.

Figure 7:
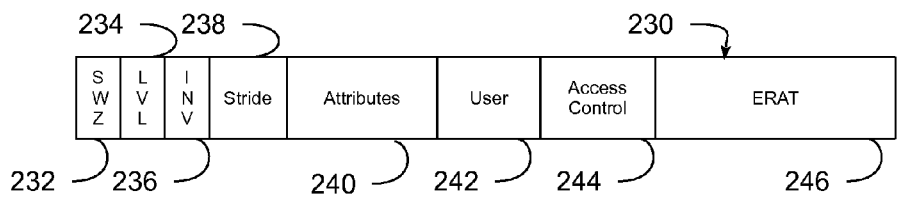
FIG. 7 is a block diagram of an exemplary ERAT entry format for the ERAT referenced in FIG. 6.

As noted above, address translation-based swizzling may be implemented by adding one or more page attributes to a memory address translation data structure, e.g., a page table entry (PTE). FIG. 7, for example, illustrates an exemplary PTE 230 capable of being maintained in an ERAT 210 or TLB 214, and extended to include various page attributes 232-238 to support address translation-based swizzling. A swizzle attribute 232, e.g., a one-bit flag, may be used to indicate whether the data in the page should be swizzled. A level attribute 234, which may be implemented using one or more bits, may be used to specify at which level data should be swizzled. In the illustrated embodiment of FIG. 6, for example, level attribute 234 may be a 1-bit value that controls whether data is swizzled only in the L1 caches or in both the L1 and L2 caches.

In addition, in some embodiments it may be desirable to optionally specify an invalidate attribute 236 that defines whether data that is swizzled and is being cast out of a cache should be written back to a lower level cache or simply invalidated. Furthermore, in some embodiments it may be desirable to include a stride attribute 238 that specifies a stride length used to swizzle data.

PTE 230 also stores additional data, similar to conventional PTEs. For example, additional page attributes 240 such as attributes indicating whether a page is cacheable, guarded, or read-only, whether memory coherence or write-through is required, an endian mode bit, etc., may be included in a PTE, as may one or more bits allocated to user mode data 242, e.g., for software coherency or control over cache locking options. An access control page attribute 244 may be provided to control what processes are permitted to access a page of memory, e.g., by specifying a process identifier (PID) associated with the process that is authorized to access the page, or optionally a combination of match and/or mask data, or other data suitable for specifying a set of processes that are authorized to access a page of memory. For example, the access control attribute may mask off one or more LSBs from a PID so that any PID matching the MSBs in the access control attribute will be permitted to access the corresponding memory page. ERAT page attribute 246 stores the effective to real translation data for the PTE, typically including the real address corresponding the effective/virtual address that is used to access the PTE, as well as the effective/virtual address, which is also used to index the ERAT via a CAM function.

It will be appreciated that the format of PTE 230 may also be used in TLB 214 and any other page table resident in the memory architecture. Alternatively, the PTEs stored in different levels of the memory architecture may include other data or omit some data based upon the needs of that particular level of the memory architecture. Furthermore, it will be appreciated that, while the embodiments discussed herein utilize the terms ERAT and TLB to describe various hardware logic that stores or caches memory address translation information in a processor or processing core, such hardware logic may be referred to by other nomenclature, so the invention is not limited to use with ERATs and TLBs. In addition, other PTE formats may be used and therefore the invention is not limited to the particular PTE format illustrated in FIG. 7.

By storing swizzle-related attributes in a PTE, the determination of whether data in a page is to be swizzled in a particular cache memory, may readily be determined in association with accessing that data. As is well known in the art, a hypervisor or other supervisor-level software, e.g., running in firmware, a kernel, a partition manager or an operating system, is conventionally used to allocate memory pages to particular processes and to handle access violations that might otherwise occur if a process attempts to access a memory page for which it is not authorized to access. Such supervisor-level software, for example, may manage an overall page table for the data processing system, with dedicated hardware in the data processing system used to cache PTEs from a page table in TLB 214 and ERATs 210. Embodiments consistent with the invention are therefore able to leverage existing supervisor-level access controls to set up on behalf of various applications or processes, what pages of memory allocated to those applications or processes will store swizzled data, and if so, how and where that data is to be swizzled.

Figure 8:
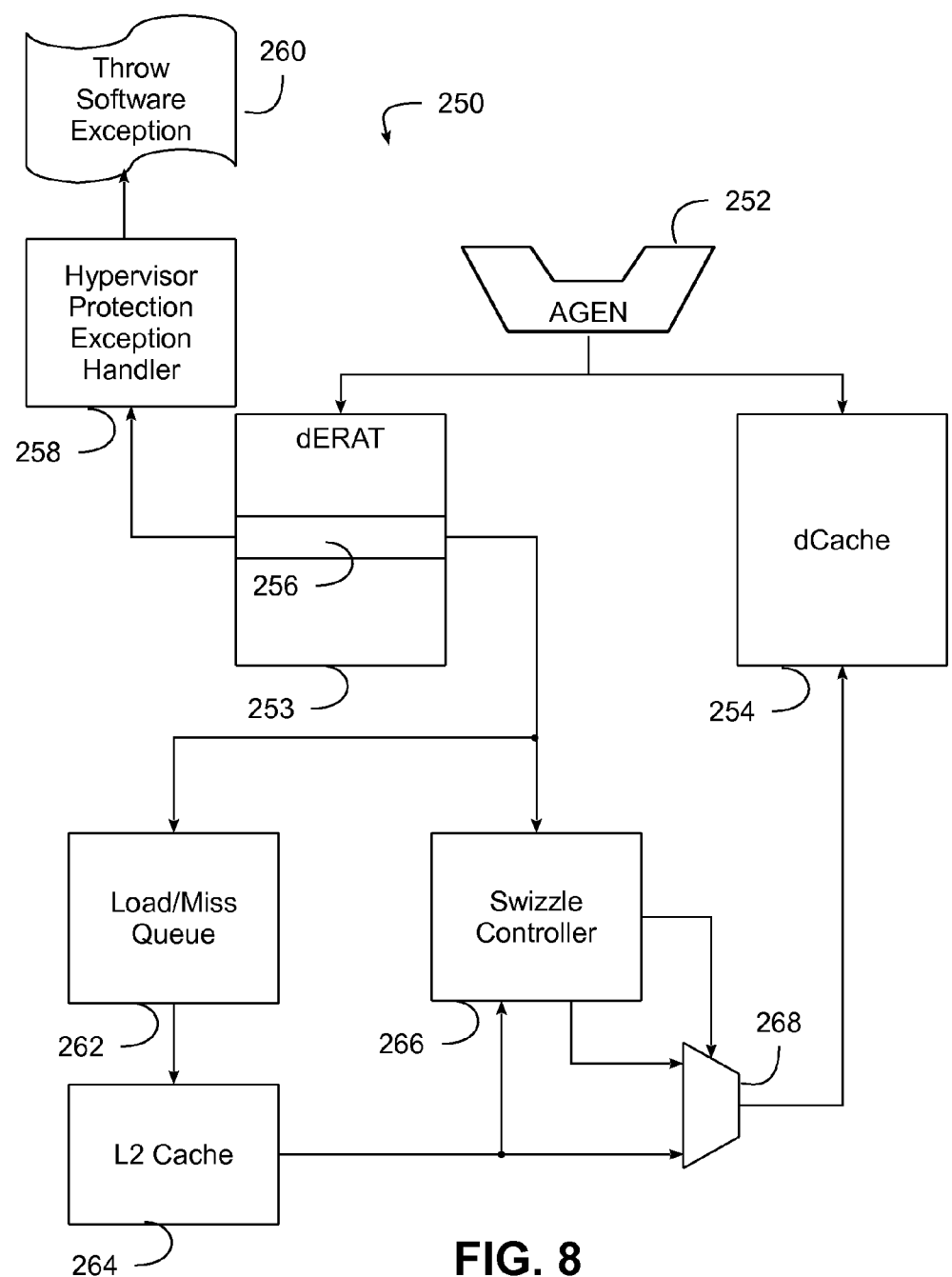
FIG. 8 is a block diagram illustrating an exemplary memory access using a data processing system supporting memory address translation-based swizzling consistent with the invention.

FIG. 8 for example, illustrates an exemplary data processing system 250, and in particular, an exemplary processing core therein, for the purposes of illustrating an exemplary memory access that utilizes address translation-based swizzling consistent with the invention. Address generation logic 252, e.g., as provided in a load/store unit of a processing core, may generate a memory access request to access data (e.g., in a cache line) from a particular page of memory, e.g., in response to an instruction executed by a hardware thread (not shown) executing in the processing core. The memory access request is issued to both an ERAT 253 and an L1 cache 254 in parallel, with the former performing an address translation operation, along with determining whether the memory access request is authorized for the PID with which the requesting hardware thread is associated, and with the latter determining whether the cache line specified by the memory access request is currently cached in the L1 cache. In the illustrated embodiment of FIG. 8, ERAT 253 is designated a "dERAT" and L1 cache 254 is designated a "dCache" to indicate that these components are associated with data accesses, and that corresponding iERAT and iCache components may be provided to handle instruction accesses (not shown).

ERAT 253, in response to the memory access request, accesses a PTE 256 for the page of memory specified by the memory access request. Hypervisor protection exception handler logic 258 compares a PID for the memory access request with the access control bits in the PTE, and if an access violation occurs as a result of the PID not being authorized to access this page of memory, logic 258 signals an interrupt by throwing a software exception to the supervisor-level software, as represented at 260. In the event that a memory access request is authorized but a miss occurs on the L1 cache, the memory access request is forwarded to a load/miss queue 262, which issues the request to a lower level of memory, e.g., an L2 cache 264.

Furthermore, as illustrated in FIG. 8, L2 cache 264 is coupled to a swizzle controller 266, which also utilizes the data in PTE 256 to determine whether to swizzle the cache line in L1 and/or L2 caches 254, 264. In the event that the cache line is to be swizzled, swizzle controller 266 controls multiplexing logic 268 to output a swizzled representation of the cache line returned by L2 cache 264, such that the swizzled cache line is stored in L1 cache 254. If not, swizzle controller 266 controls multiplexing logic 268 to feed the cache line from L2 cache 264 to L1 cache 254 in an unaltered form. Swizzle controller 266 may be disposed in or otherwise coupled to various components in data processing system 250, e.g., within the L2 cache 264. It may be desirable in many embodiments, for example, to locate a swizzle controller in the lowest level of memory that is expected to store cache lines in an unswizzled format so that the swizzle controller may swizzle the data in connection with fulfilling a cache line request from a higher level cache.

Figure 9:
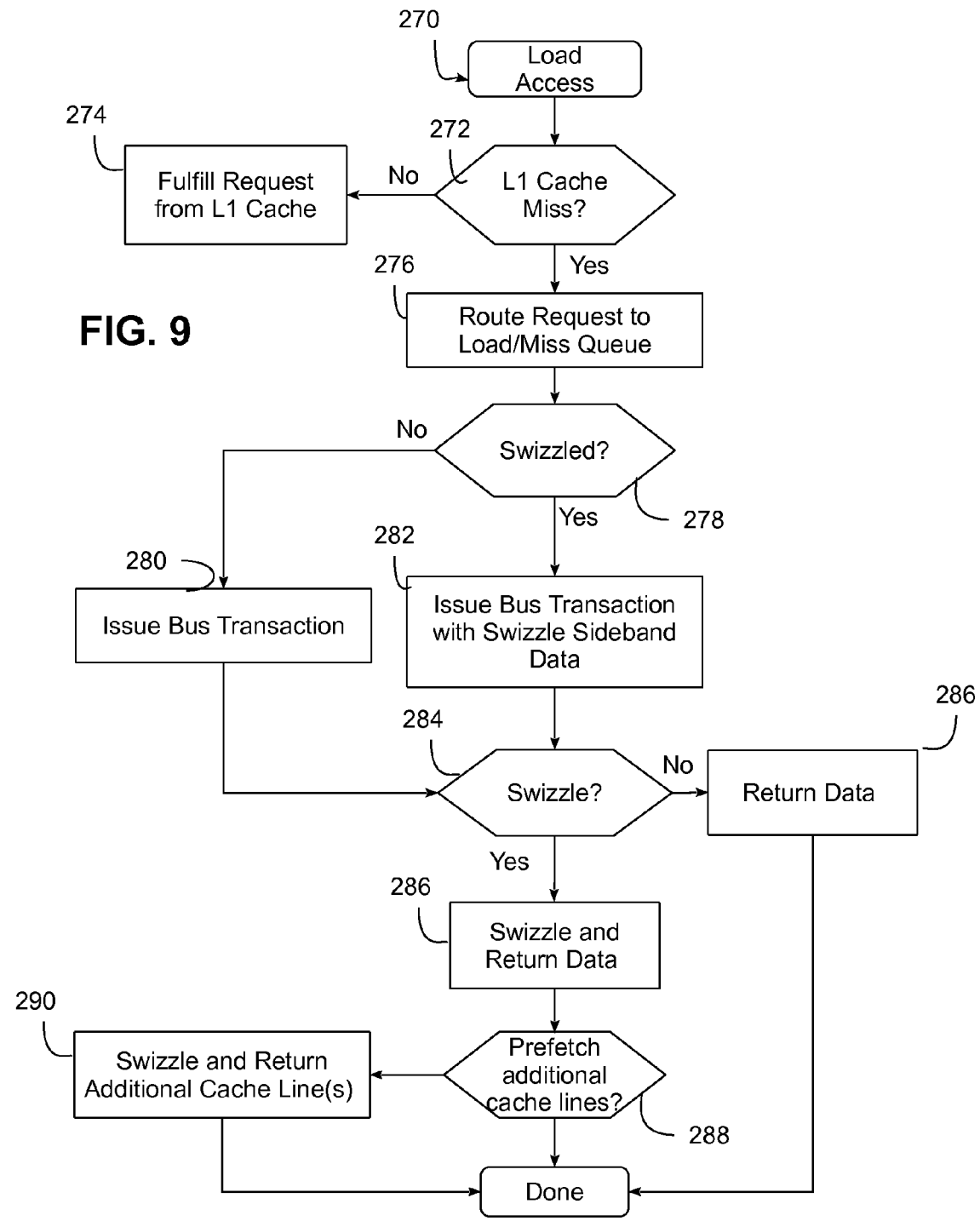
FIG. 9 is a flowchart illustrating an exemplary sequence of operations for performing a load access in the data processing system of FIG. 8.

FIG. 9 illustrates in greater detail a sequence of operations 270 that may be performed in response to a memory access requests issued by a hardware thread on behalf of a process in data processing system 250 to load data from a cache line. In order to simplify this discussion, it is assumed that protection logic has already determined that the requesting thread has the right to access the page associated with the memory access request, so access control-related steps are not illustrated in FIG. 9. Thus, if a thread is accessed to load data from a particular cache line, a determination is made as to whether the request can be fulfilled by L1 cache 254 (block 272). If the memory access request does not miss on L1 cache 254, the request is fulfilled by L1 cache 254 (block 274), and handling of the memory access request is complete.

However, if the request misses on L1 cache 254, the request is routed to load/miss queue 262 in block 276 to add an entry in the queue corresponding to the request. In addition, it may be desirable to set one or more attributes in the entry to correspond to the swizzle-related attributes stored in the PTE for the cache line. Next, prior to issuing the request to a lower level memory, e.g., over a memory bus to either an L2 cache or a lower level memory, a determination is made in block 278 as to whether the page is indicated to be swizzled, as determined from the page attributes in PTE 256. If not, a bus transaction is issued for the memory access request in block 280. On the other hand, if the page is to be swizzled, a bus transaction is issued in block 286 with additional swizzle-related sideband data from PTE 256.

The swizzle-related sideband data may be communicated over a memory bus in a number of manners consistent with the invention. For example, additional control lines may be provided in a bus architecture to specify whether a bus transaction is associated with swizzled data so that a determination of whether data is to be swizzled may be determined based upon the state of one or more control lines. Alternatively, transaction types may be associated with swizzled data so that a determination may be made simply based upon the transaction type of the bus transaction. In still other embodiments, no swizzle-related sideband data may be provided, and the swizzle-related attributes may be retained in PTEs in multiple levels of memory.

Next, in block 284, the bus transaction is received by the L2 cache 264, and in particular by the swizzle controller 266 therein, which determines whether the data is to be swizzled in the L1 cache, e.g., based upon the sideband data provided with the bus transaction or from a copy of a PTE in a TLB associated with the L2 cache. If not, control passes to block 286 to return the requested cache line, either directly from the L2 cache, or, if not presently cached in the L2 cache, from the main memory.

Otherwise, if the cache line is to be swizzled, block 284 passes control to block 286 to swizzle the data prior to returning the data to the L1 cache. The manner in which the data is swizzled is typically based on a hard-coded algorithm, or alternatively, a customizable algorithm based on stride length and/or data size specified via swizzle-related page attributes. In addition, as illustrated in block 288 if the stride length and/or data size cross cache lines and if a mode bit or other control information indicate that more than one cache line should be retrieved, control may pass to block 290 to swizzle and return one or more additional cache lines in response to the request.

Figure 10:
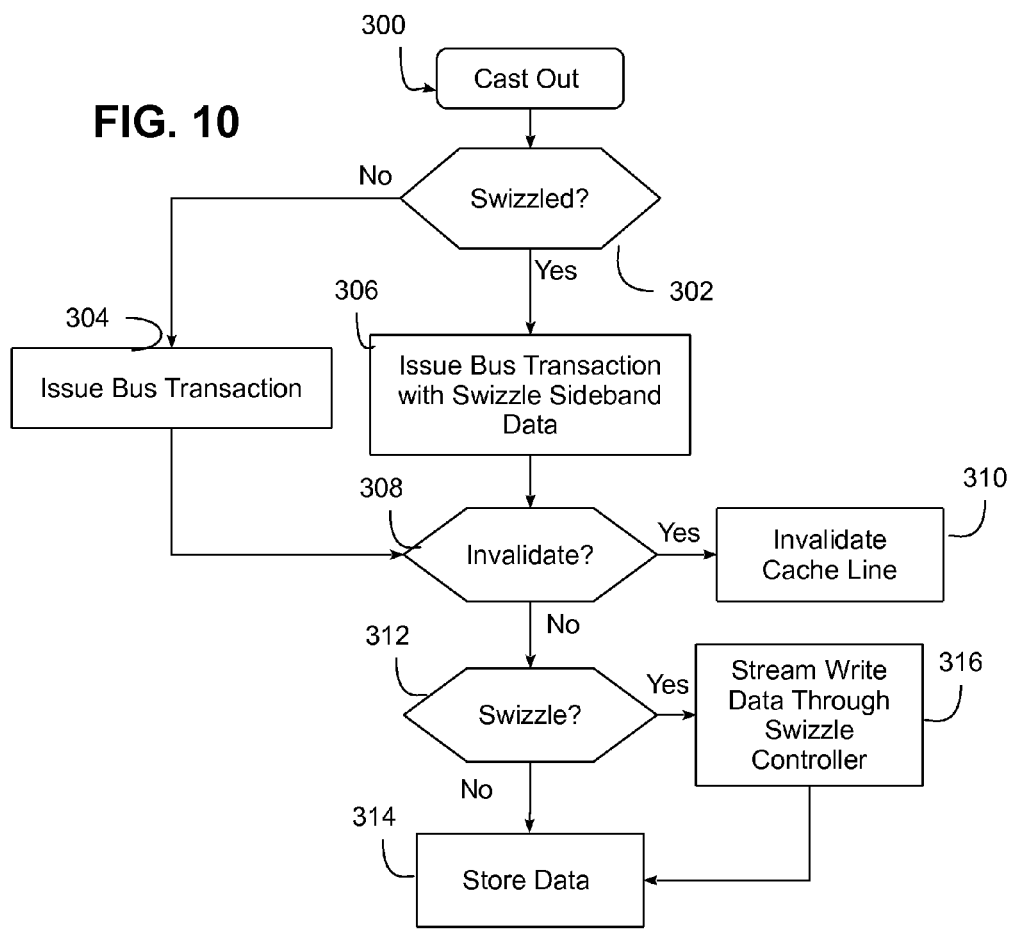
FIG. 10 is a flowchart illustrating an exemplary sequence of operations for performing a cast out in the data processing system of FIG. 8.

FIG. 10 next illustrates a cast out routine 300 that may be executed, for example, whenever modified data in the L1 cache is being cast out to the L2 cache or a lower level of memory. Based upon whether the PTE indicates that the data is swizzled (block 302), a bus transaction is issued without (block 304) or with (block 306) swizzle sideband data. The L2 cache receives the bus transaction in block 308 and determines whether any swizzle-related attributes indicate that the data is to be invalidated rather than written back to the L2 cache. It may be desirable to invalidate, for example, if the data does not need to be written back to lower level memory, e.g., if the data is read-only data.

If the data is to be invalidated, control passes to block 310 to simply invalidate the cache line in the L2 cache. Otherwise, control passes to block 312 to determine whether the data is swizzled. If not, control passes to block 314 to store the data unchanged in the L2 cache. If the data is swizzled, control instead passes to block 316 to stream the data through the swizzle controller to deswizzle the data, prior to storing the data in the L2 cache.

Figure 11:
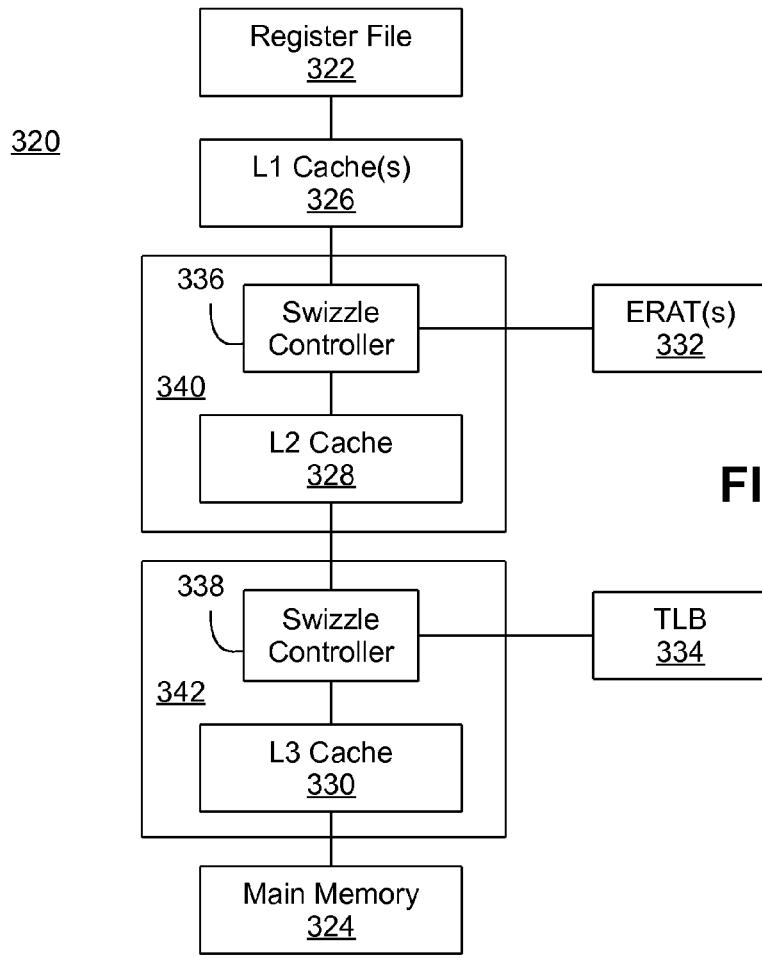
FIG. 11 is a block diagram illustrating an exemplary data processing system including multiple levels of address translation-based swizzling consisting with the invention.

Swizzle control logic may be disposed at different levels of a memory subsystem consistent with the invention. For example, FIG. 11 illustrates a data processing system 320 including a register file 322 coupled to a main memory 324 through three levels of cache: L1 cache 326, L2 cache 328 and L3 cache 330. Address translation data structures, e.g., ERAT 332 and TLB 334, may be disposed at various levels of the memory subsystem, and swizzle logic, taking the form of a swizzle controller 336, 338, may be disposed at various levels of the memory subsystem as well. In some embodiments, the swizzle logic may be integrated into a cache controller, e.g., L2 or L3 cache controllers 340, 342.

In other embodiments, however, swizzle logic may be separate from any cache controller, and may be disposed within or outside of a processor or processing core. In general, implementation of swizzle logic to implement the herein-described functionality is well within the abilities of one of ordinary skill in the art having the benefit of the instant disclosure.

Figure 12:
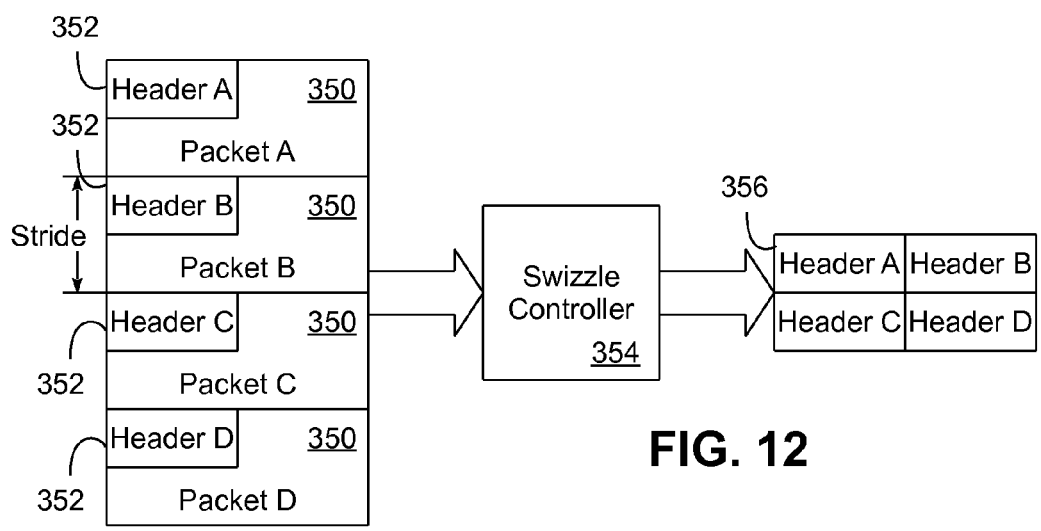
FIG. 12 is a block diagram illustrating swizzing of packet headers using address translation-based swizzling consistent with the invention.

It will be appreciated that the herein-described embodiments may be useful in a number of applications. For example, as illustrated in FIG. 12, it may be desirable in a network-processing application to process multiple packets 350 in parallel by swizzling together the first byte, or the first few bytes, of the headers 352 of multiple packets 350 using a swizzle controller 354 such that the headers, or portions thereof, of multiple packets are packed into the same cache lines. The resulting swizzled data, as illustrated at 356, includes only the desired bytes of the headers 352 of multiple packets 350, such that, for example, preprocessing of multiple packets may be performed in parallel using a vector processing unit. As noted above, the flexibility of the herein-described embodiments would permit a stride length that was equal to the packet size, but not necessarily aligned with the cache line organization, such that swizzling of multiple packets may additionally result in the prefetching of one or more additional cache lines in association with a load request for a swizzled cache line.

Therefore, embodiments consistent with the invention may be used to facilitate swizzling of data to optimize processing of retrieved data, particularly in association with vectorized processing units, and with reduced latencies associated with retrieving swizzled data. Various additional modifications may be made to the disclosed embodiments without departing from the spirit and scope of the invention. Therefore, the invention lies in the claims hereinafter appended.

What is claimed is:

1. A circuit arrangement, comprising:
   a cache memory;
   a memory address translation data structure for use in performing a memory address translation for a memory access request initiated by a processing unit in communication with the cache memory, the memory address translation data structure including translation data that translates between a real memory address and an effective or virtual memory address for a memory page associated with the memory access request and at least one swizzle-related page attribute that indicates on a page basis whether data in the memory page associated with the memory access request should be swizzled; and
   control logic configured to cause data from the memory page to be stored in the cache memory in a swizzled format based upon the at least one swizzle-related page attribute in the memory address translation data structure, wherein at least a portion of the control logic is coupled intermediate the cache memory and a lower memory, and wherein the control logic is configured to cause the data to be stored in the cache memory in the swizzled format by swizzling the data to generate swizzled data and storing the swizzled data in the cache memory.

2. The circuit arrangement of claim 1, wherein the memory address translation data structure includes a plurality of page table entries, each page table entry including a real address associated with the memory page associated with the page table entry and the swizzle-related page attribute associated with such memory page.

3. The circuit arrangement of claim 1, wherein the at least one swizzle-related page attribute includes a level attribute, and wherein the control logic is configured to selectively swizzle the data if the level attribute indicates that the data is to be swizzled in the level associated with the cache memory.

4. The circuit arrangement of claim 3, wherein the cache memory is an L1 cache, wherein the data processing system includes an L2 cache, and wherein the data is swizzled in the L1 cache but not in the L2 cache based on the level attribute.

5. The circuit arrangement of claim 1, wherein the at least one swizzle-related page attribute includes a stride length attribute, and wherein the control logic is configured to swizzle the data using a stride length associated with the stride length attribute.

6. The circuit arrangement of claim 1, wherein the at least one swizzle-related page attribute includes an invalidate attribute, and wherein the control logic is further configured to invalidate a cache line associated with the data in response to a cast out of the cache line based on the invalidate attribute.

7. The circuit arrangement of claim 1, wherein the data is associated with a cache line, and wherein the control logic is further configured to prefetch at least one additional cache line based on the at least one swizzle-related attribute.

8. The circuit arrangement of claim 7, wherein the control logic is configured to prefetch the at least one additional cache line based on at least one of a stride length attribute and a data size attribute.

9. The circuit arrangement of claim 1, wherein the data is associated with a cache line, wherein the memory page includes a plurality of packets, each packet including a header, and wherein the control logic is configured to selectively swizzle the data by packing at least a portion of the headers of multiple packets into the same cache line.

10. An integrated circuit device comprising the circuit arrangement of claim 1.

11. A program product comprising a non-transitory computer readable medium and logic definition program code stored on the non-transitory computer readable medium and defining the circuit arrangement of claim 1.

* * * * *